United States Patent
Elmhurst et al.

(10) Patent No.: US 6,356,062 B1
(45) Date of Patent: Mar. 12, 2002

(54) DEGENERATIVE LOAD TEMPERATURE CORRECTION FOR CHARGE PUMPS

(75) Inventors: Daniel R. Elmhurst, Cameron Park; Binh N. Ngo, Folsom; Rupinder K. Bains, Antelope, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/670,850

(22) Filed: Sep. 27, 2000

(51) Int. Cl.[7] ................................................ G05F 1/56
(52) U.S. Cl. ........................ 323/282; 323/907
(58) Field of Search ................. 323/280, 273, 323/282, 351, 907

(56) References Cited

U.S. PATENT DOCUMENTS

| | | | | |
|---|---|---|---|---|
| 4,352,053 A | * | 9/1982 | Oguchi et al. | 323/220 |
| 4,560,959 A | * | 12/1985 | Rokos et al. | 331/176 |
| 4,823,070 A | * | 4/1989 | Nelson | 323/285 |

\* cited by examiner

*Primary Examiner*—Adolf Deneke Berhane
(74) *Attorney, Agent, or Firm*—Blakely, Sokoloff, Taylor & Zafman LLP (57) ABSTRACT

A regulator circuit to control the output of a charge pump circuit, to reduce the effects of operating temperature and process variations on available output current from the charge pump circuit. A predetermined fraction of the output voltage of the charge pump circuit is fed back to the input of a differential amplifier, which compares it to a reference voltage. The output of the differential amplifier feeds a voltage controlled oscillator (VCO), which in turn generates a clock signal that is used to drive the charge pump circuit. The normal temperature characteristics of this configuration cause the output of the charge pump circuit to degrade with temperature changes. The regulator circuit can be placed between the differential amplifier and the VCO to adjust the voltage driving the VCO. In one embodiment, a biasing resistor with a negative temperature coefficient can be used in the regulator circuit to offset the normal effects of temperature on the circuit. In another embodiment, multiple such resistors can be selectable with programmable logic, so that process variations during manufacture can be compensated for by selecting the resistor value that most closely provides optimal biasing.

18 Claims, 7 Drawing Sheets

DEGENERATIVE LOAD TEMPERATURE CORRECTION FOR CHARGE PUMPS

BACKGROUND OF THE INVENTION

1. Field of the Invention

The invention pertains generally to electronic circuits. In particular, it pertains to charge pump circuits.

2. Description of the Related Art

A charge pump provides an output voltage that is higher than its own supply voltage. Flash memories can use charge pumps to produce erase and program voltages.

Figure 1A:
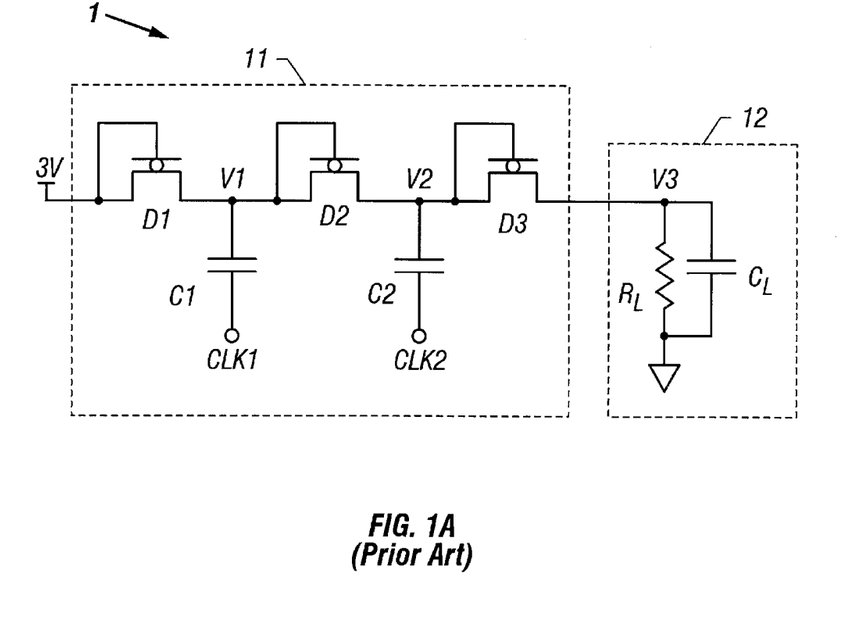
FIG. 1A shows a charge pump circuit of the prior art.
Figure 1B:
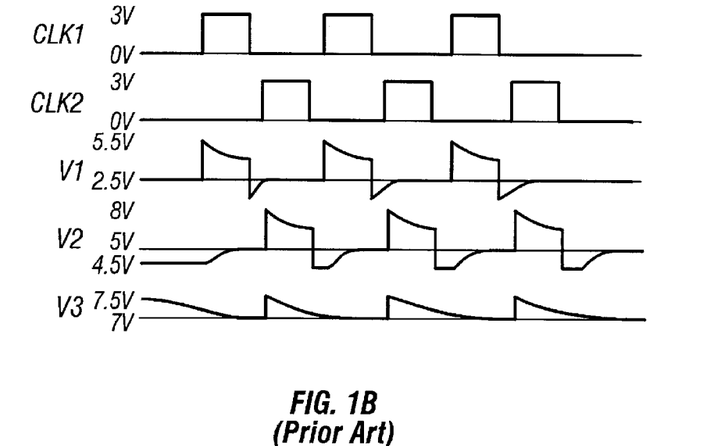
FIG. 1B shows various waveforms produced by the circuit of FIG. 1A.

FIG. 1A shows a schematic of a simple charge pump circuit 1, with two-stage charge pump 11 driving load 12. This figure shows only capacitors C1–C2 and diodes D1–D3 to produce voltages V1, V2, and V3, with resistor RL and capacitor $C_L$ providing the load, although other components could be added to the circuit for improved performance. FIG. 2B shows the various waveforms that are produced by this circuit. The operation of charge pumps is well known, and no further description of the circuit is provided herein.

The effectiveness of a charge pump is dependent on the frequency of the clock source, since the clock cycle affects the amount of charging and discharging that takes place in the capacitors.

Figure 2:
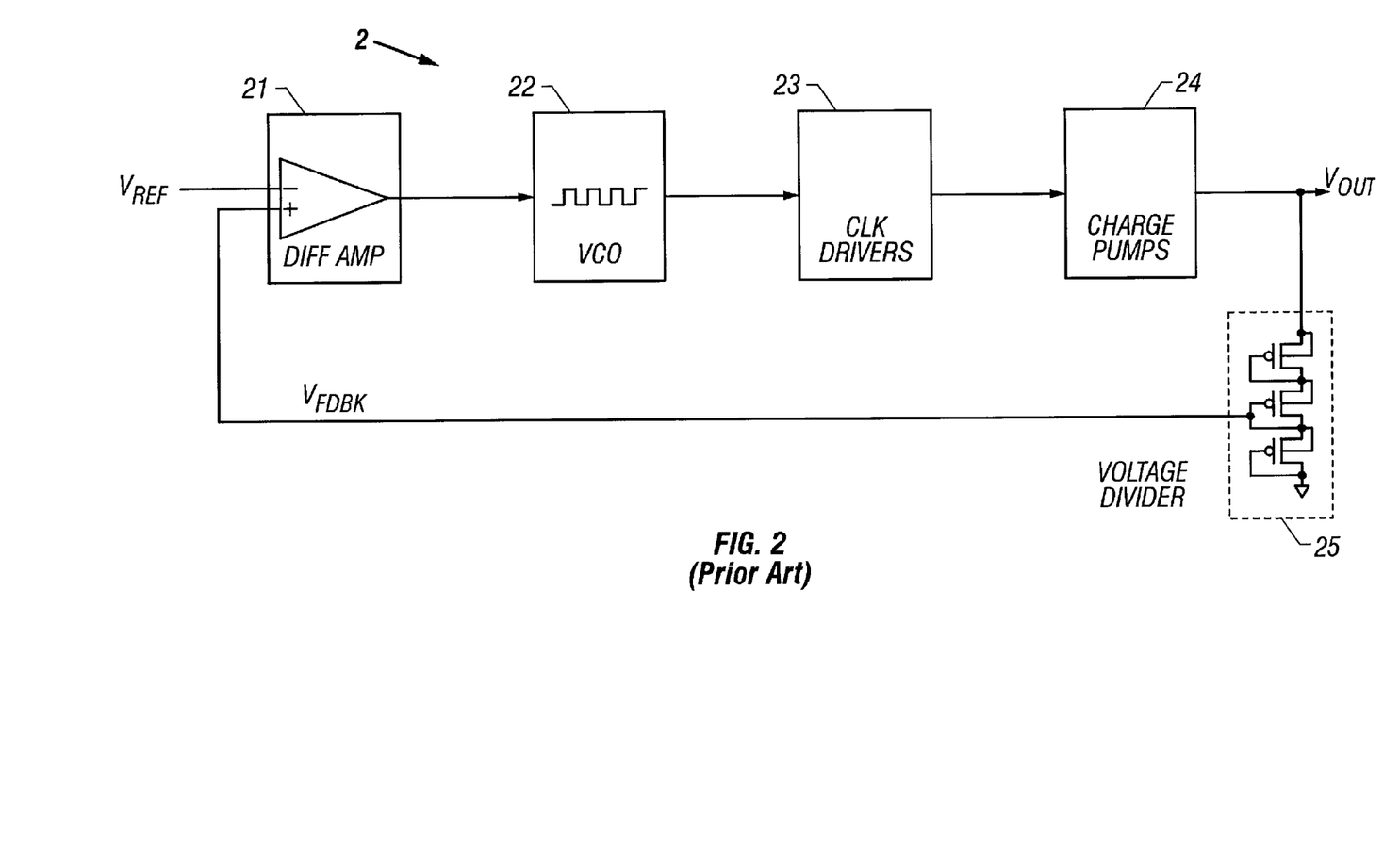
FIG. 2 shows a charge pump system of the prior art.

FIG. 2 shows a charge pump control circuit 2. A voltage controlled oscillator (VCO) 22 provides the clock source, with its frequency being controlled by the output of differential amplifier 21. Clock drivers 23 convert the single VCO output to the multiple clocks required to drive multi-stage charge pump circuit 24. The voltage $V_{OUT}$ produced by charge pump circuit 24 can be sampled by voltage divider 25, which feeds back a pre-determined fraction of $V_{OUT}$ as voltage $V_{FDBK}$. This is compared with a stable reference voltage $V_{REF}$ by differential amplifier 21, and the difference between $V_{REF}$ and $V_{FDBK}$ controls the output of differential amplifier 21, which in turn controls the frequency of the VCO clock. This closed loop circuit regulates the output of the charge pumps by controlling the frequency of the clocks that operate the charge pumps. Under a given set of conditions, every charge pump circuit has an optimum frequency that produces the maximum amount of current available from the circuit.

Unfortunately, the charge pumps and the regulation circuitry are subject to variations due to both temperature changes during operation and process variations during manufacture. Typically, for a given frequency from VCO 22, the maximum current from the charge pump circuit changes with changing temperature, so that the circuit must be overdesigned to handle the expected current demands at the worst case temperature. And process variations during manufacture can result in a circuit that is not optimized at any temperature.

Figure 3:
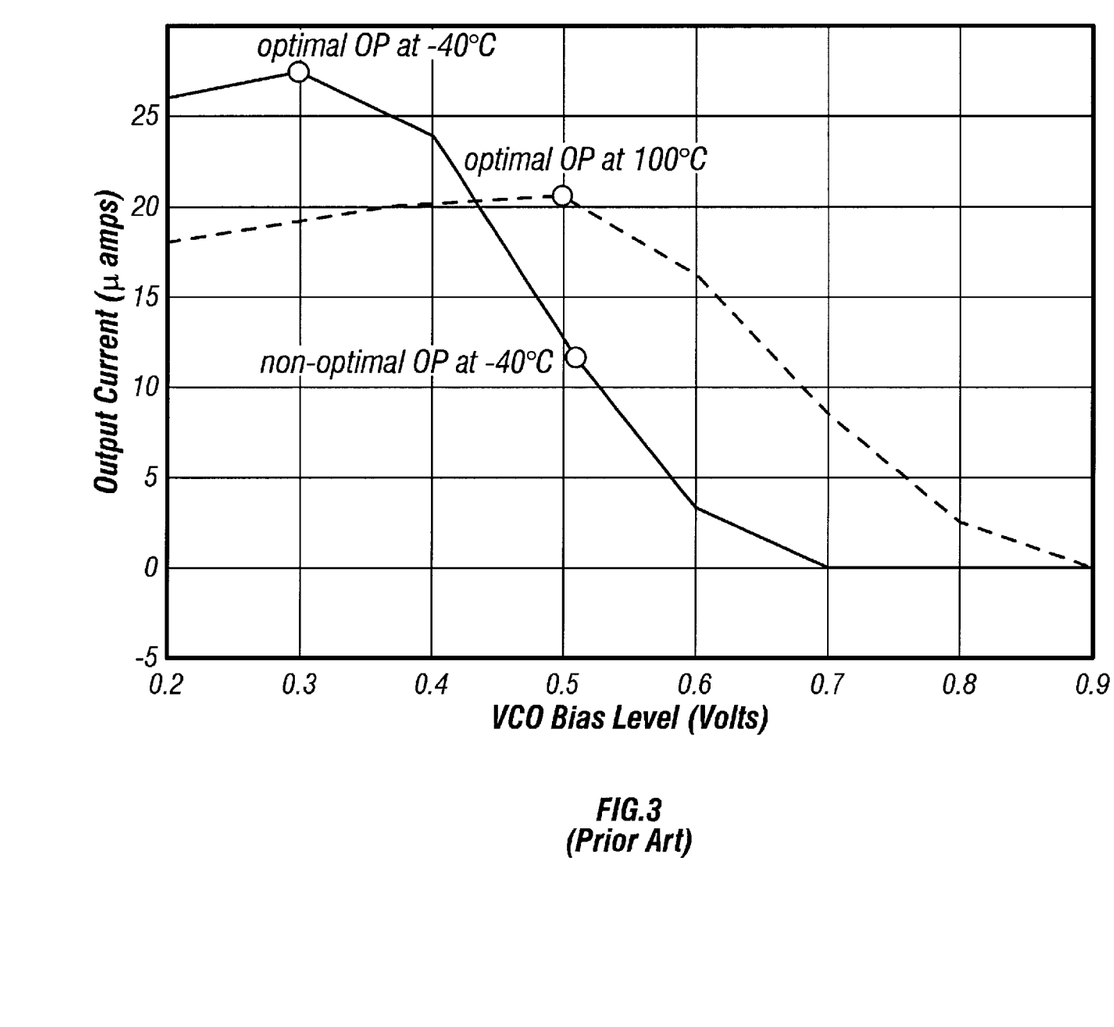
FIG. 3 shows a graph of the characteristics of a conventional charge pump circuit.

FIG. 3 shows a graph of the operating characteristics of a typical charge pump circuit. The x-axis measures the VCO bias level (the voltage level at the input of the VCO), while the y-axis measures the corresponding output current, in micro-amps, that the charge pump circuit can produce. The dotted line shows the characteristics of the circuit at a temperature of 100 degrees C. For this example, the available output current is fairly constant with a bias level of up to 0.5 volts, but beyond 0.5 volts the output current drops off sharply, making the optimum bias voltage about 0.5 volts or slightly less.

The solid line shows the same curve for a temperature of −40 degrees C. The entire curve is shifted to the left by a significant amount, with the optimum bias level at about 0.3 volts. From this chart, it can be seen that a higher temperature requires a higher bias voltage, if the maximum current is to be available from the circuit at all operational temperatures.

Unfortunately, conventional circuits do not provide this adjustment, and the circuits must be designed for worst case conditions. This results in overdesign, which is more expensive and wasteful of circuit resources.

DETAILED DESCRIPTION OF THE INVENTION

The invention can provide improved charge pump regulation by compensating for temperature changes and process variations. A regulator circuit can be placed between the differential amplifier and VCO of FIG. 2, to control the voltage that is input to the VCO and thereby regulate the frequency provided by the VCO. This frequency regulation can be used to adjust the clocks to the charge pump circuit to achieve improved current output.

As one of ordinary skill in the art can appreciate, the various components of a charge pump system will operate in the same relative thermal environment. Although each component may generate a different amount of heat, resulting in a slightly different internal operating temperature for each, a change in the temperature of the operating environment will produce a corresponding change in the temperature of all the components. All components should therefore see the same increase or decrease in operating temperatures. This simplifies any thermal analysis, by allowing temperature compensation to be based on changes in the operating environment, without regard to individual differences in temperature from one component to the next.

Figure 4:
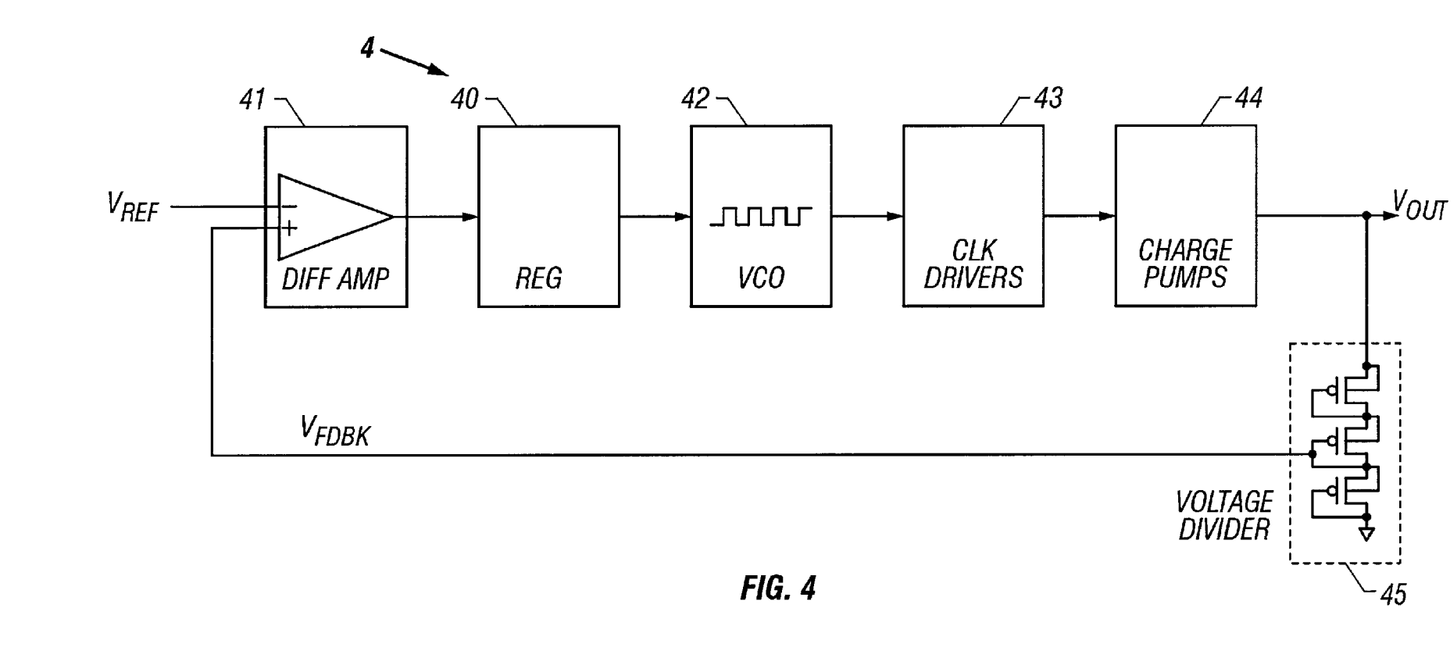
FIG. 4 shows a system of the invention.

FIG. 4 shows a charge pump control system 4, with differential amplifier 41, VCO 42, clock driver circuit 43, charge pump circuit 44 and voltage divider 45 corresponding to their counterparts 21, 22, 23, 24 and 25 in FIG. 2. In the system of the invention, a regulator circuit 40 can be placed between the output of differential amplifier 41 and the input of VCO 42. Regulator circuit 40 can vary the output voltage of the differential amplifier by varying the load placed on the differential amplifier's output. This regulated voltage can then be passed on to VCO 42.

Figure 5:
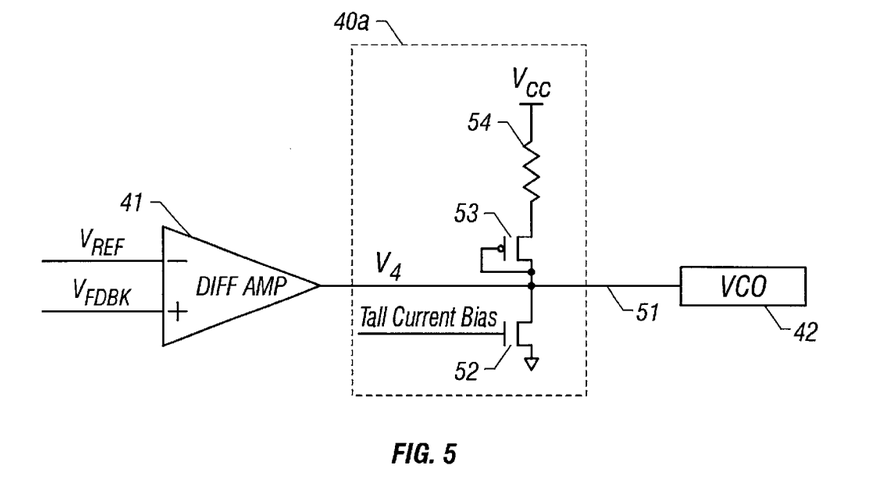
FIG. 5 shows a circuit of one embodiment of the invention.

FIG. 5 shows a schematic of an embodiment 40a of regulator circuit 40, and its connections to differential amplifier 41 and VCO 42. Bias line 51 connects the output of differential amplifier 41 to the input of VCO 42. Bias line 51 can provide a direct connection, without any intervening active components. Although referred to as a "line", bias line 51 may have any configuration, and no inference should be drawn as to its physical shape or size. Diode 53 and transistor 52 can be configured to vary the differential amplifier output voltage V4 on bias line 51 between 0V and Vcc. At Vcc, the oscillator will shut off, and as the voltage drops below Vcc, the frequency of the pump clock from VCO 42 increases.

Transistor 52 can be a tail current bias transistor. Transistor 52 can control the current running through differential amplifier 41 by biasing the output of the amplifier and thereby controlling the amplifier's output voltage characteristics. The gate voltage of transistor 52 controls its output conductance, which in turn affects the load seen by differential amplifier 41 and thereby affects voltage V4. A tail current bias circuit, which is known in the art, normally has a temperature coefficient that is negative. As its temperature increases, it pulls V4 down to a lower value. However, V4 is the bias voltage for VCO 42. As seen in FIG. 3, an increase in temperature should be accompanied by an increase in VCO bias voltage if optimum levels of current output from the charge pumps are to be attained. Thus the temperature characteristics of transistor 52 operate in the opposite direction than is desired if optimum charge pump current is to be attained across all operating temperatures.

A resistor circuit comprising resistor 54 can be used to control the voltage drop from Vcc to diode 53, and thereby control the voltage V4. If resistor 54 is a standard resistor, its resistance will increase as its temperature increases, producing a greater voltage drop and lowering the value of V4. Again referring to FIG. 3, an increase in temperature should be accompanied by an increase in VCO bias voltage if optimum levels of current output from the charge pumps are to be attained. Thus a standard resistor would operate in the opposite direction than is desired. This, combined with the aforementioned temperature-dependent effects of transistor 52, would operate to worsen the temperature characteristics of the charge pumps by exaggerating the charge pump output variance that occurs with temperature changes.

These effects can be offset by using a resistor with opposite temperature characteristics. In one embodiment of the invention, resistor 54 has a negative temperature coefficient. In a resistor with a negative temperature coefficient, resistance decreases as temperature increases. When a resistor with a negative temperature coefficient is used as resistor 54 in the circuit of FIG. 5, an increase in temperature decreases the resistance of resistor 54, thereby decreasing the voltage drop across the resistor and increasing the value of V4. Referring to FIG. 3 again, it can be seen that increasing the temperature moves the characteristic curve, and its associated optimum current point, to the right. Increasing V4 moves the VCO bias voltage to the right in FIG. 3, so the bias voltage can follow the optimum current point as the temperature changes. The use of a resistor 54 with a negative temperature coefficient can be used to partially or fully offset the temperature-dependent characteristics of the tail current bias transistor and the charge pumps that cause available output current to degrade with temperature changes.

Figure 6:
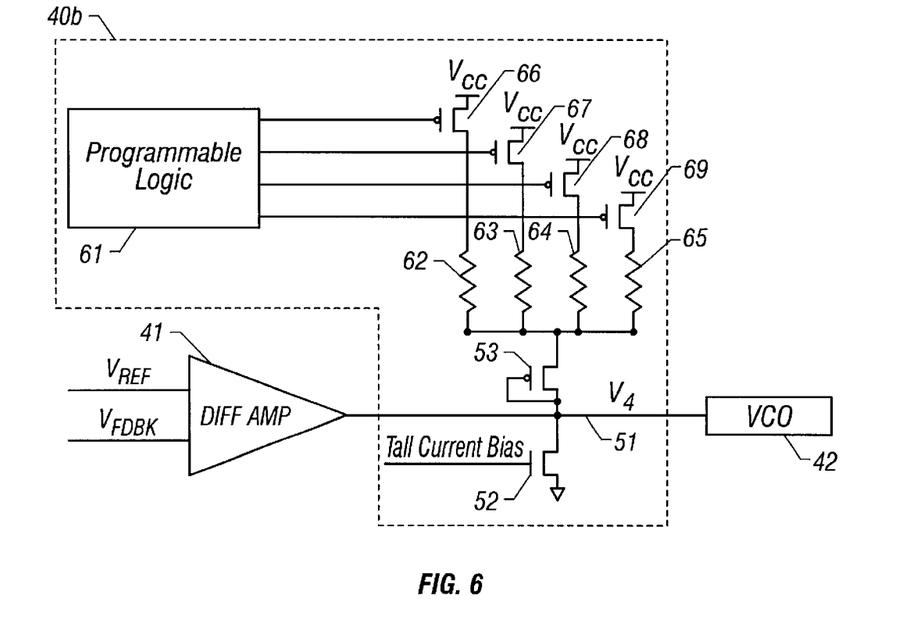
FIG. 6 shows a circuit of another embodiment of the invention.

Other conditions can also cause variation in the bias voltage, not with temperature, but from device to device. Due to normal process variations in manufacturing differential amplifiers, VCOs, charge pumps, and resistors, resistor 54 may provide optimal bias in one unit, but non-optimal bias in another unit. The embodiment 40b of regulator circuit 40 shown in FIG. 6 can provide an adjustment for this condition. Rather than the single resistor 54 of FIG. 5, FIG. 6 shows a resistor circuit comprising multiple resistors 62–65, switches 6669, and programmable logic 61. Each resistor 62–65 can have a slightly different resistance. Each resistor 62–65 can be enabled or disabled (connected to Vcc or isolated from Vcc) by turning on or off the associated switch 66–69. Each switch can comprise a transistor. If one of the switches 66–69 is turned on, its associated resistor 62–65 is effectively connected between Vcc and diode 53, thus providing a biasing resistor to diode 53. If one of switches 66–69 is turned off, its associated resistor 62–65 is essentially disconnected from Vcc, effectively removing that resistor from the circuit. Programmable logic 61 can be used to individually turn on or turn off individual transistors 66–69. During manufacture, the optimum resistance value that will provide the desired bias voltage for circuit 40b can be determined. Programmable logic 61 can then be programmed to turn on or off the right resistor, or combination of resistors, that will come closest to providing this optimum resistance. In one embodiment, only one resistor 62–65 is turned on at a time. In one embodiment, each resistor provides a voltage difference of 75 millivolts to diode 53 as compared to an adjacent resistor.

By measuring VCO and/or charge pump characteristics under controlled conditions during manufacturing, the proper resistor can be selected to provide optimal or near-optimal voltage to the VCO. Programmable logic 61 can then be programmed to select the proper resistor. Thus each charge pump system 4 can be individually manufactured to provide the correct bias voltage for its particular operating characteristics. Programmable logic 61 can be any form of non-volatile memory or latch circuit, such as fusible links or a programmable gate array.

Figure 7:
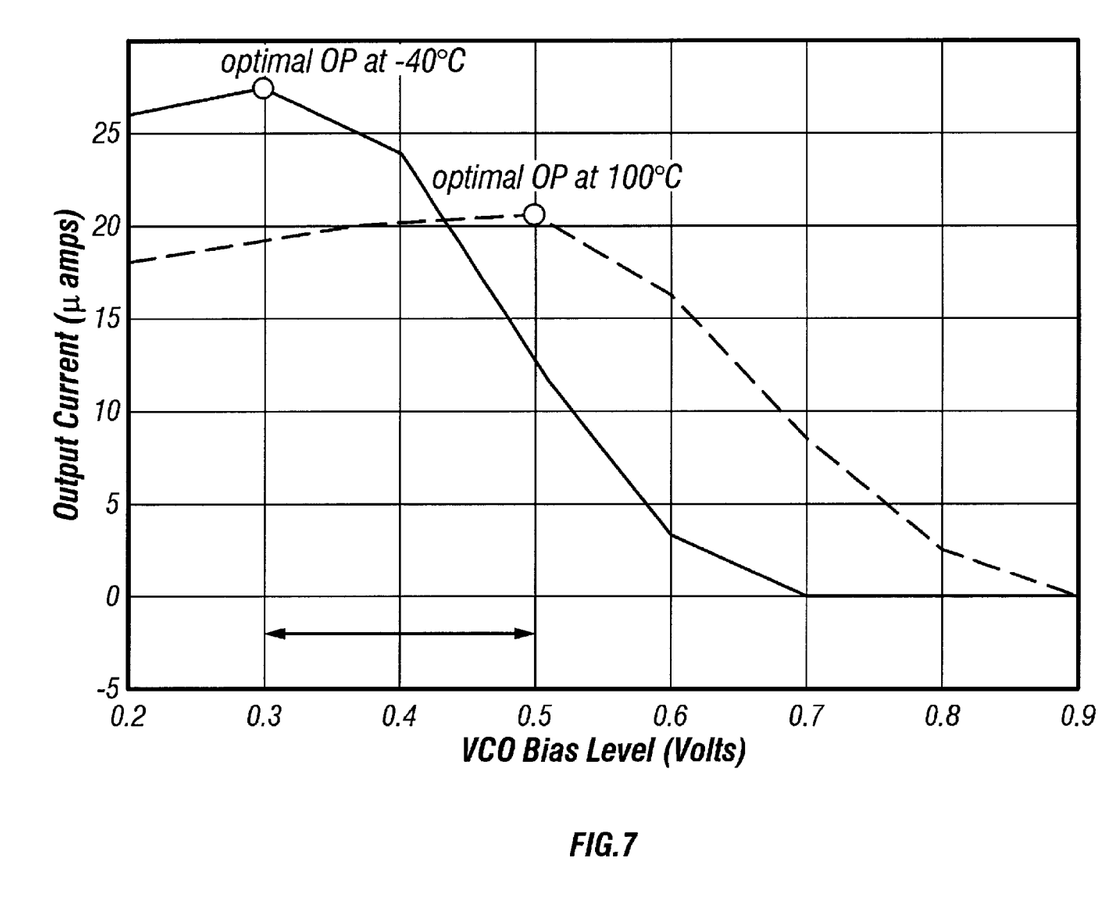
FIG. 7 shows a graph of the characteristics of a charge pump circuit of the invention.

FIG. 7 shows an example of how a resistor, properly selected with programmable logic 61 and having a negative temperature coefficient, can shift the VCO input voltage with changing temperature so that charge pump output current will remain near optimum levels. Assuming a temperature increase from −40 degrees C. to +100 degrees C., the output of differential amplifier 41 can be shifted from 0.3 volts to 0.5 volts. This keeps the VCO bias voltage at or near the optimum part of the curve as the curve moves from left to right. With output current no longer strongly dependent on temperature, the circuit does not have to be overdesigned for worst-case temperatures that are seldom encountered, and can be designed for normal operating temperatures.

Figure 8:
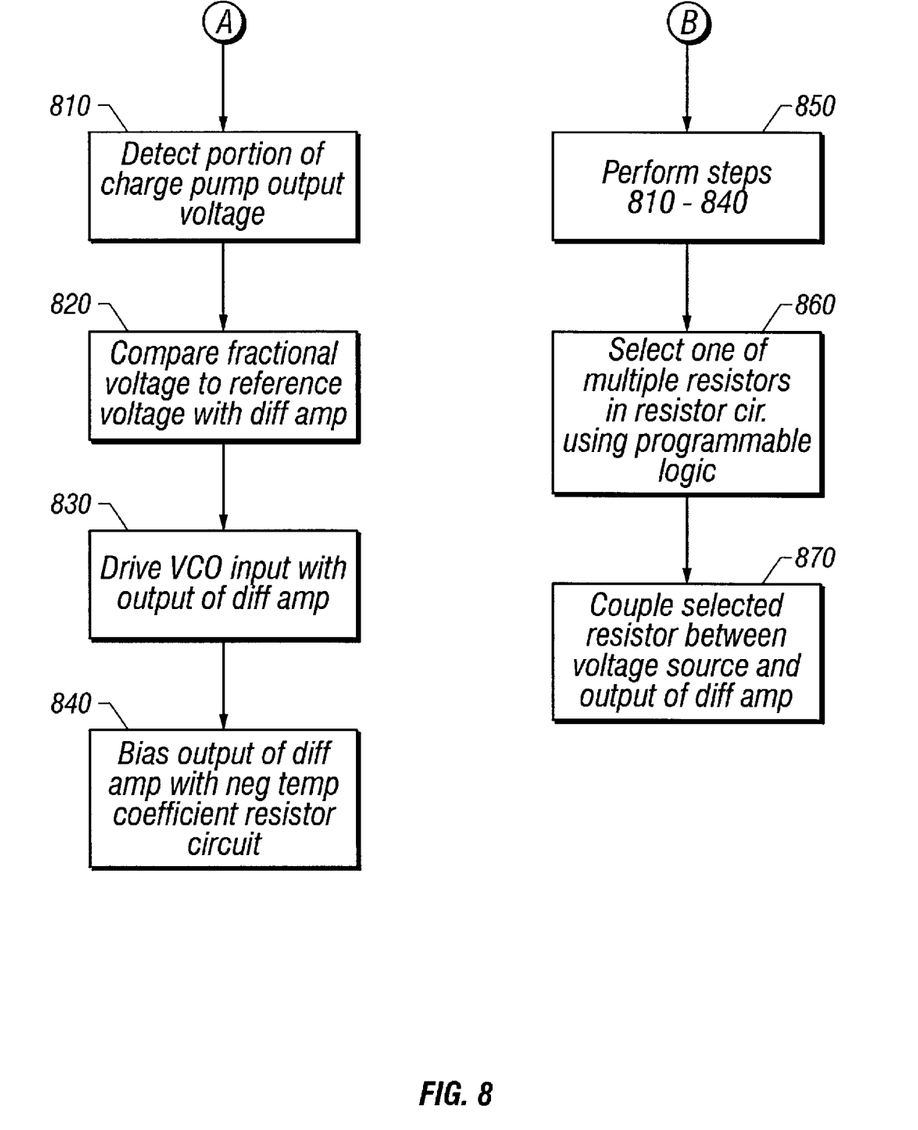
FIG. 8 shows a flow chart of a method of the invention.

FIG. 8 shows a flow chart of a method of the invention. Starting at point A, a portion of the output voltage from a charge pump can be detected at step 810. At step 820, this fractional voltage can be compared to a reference voltage with a differential amplifier. A voltage divider circuit can be used to obtain a predetermined fraction of the output in step 810, since the full output voltage may be too high to make a useful comparison at step 820. At step 830, the output of the differential amplifier can be used to drive the input of a voltage controlled oscillator. The output of the differential amplifier can be biased at step 840, using a bias resistor circuit that has a negative temperature coefficient.

For programming a resistor circuit to accommodate process variations, flow chart B can be used. For brevity, steps 810–840 are consolidated into a single step 850 in the flow chart. At step 860, one of multiple resistors in the resistor circuit is selected, using programmable logic. At step 870, the selected resistor is coupled between a voltage source and the output of the differential amplifier. Although not shown in the flow chart, the selected resistor may be coupled through other elements, such as diode 53 in FIG. 5.

The charge pumps described herein are configured to amplify voltages of the same polarity. For example, a supply of +3 volts was shown being increased to about +7.5 volts. The supply voltage and final voltage may be different from these amounts without departing from the scope of the invention. Furthermore, the polarity of the voltages can be changed, for example from a positive supply voltage to a negative final voltage. In one embodiment, a flash memory supply voltage is about +1.8 volts and an erase voltage is about −10 volts. Polarity changes can be accomplished in various known ways, including level shifting circuitry. Such techniques are well known in the art and are not further described herein.

Specific transistors have been shown in the figures as either P-channel or N-channel. These selections have been used to illustrate particular embodiments of the invention, but the choice of P- or N-channel devices can vary from the described embodiments without departing from the scope of the invention.

The foregoing description is intended to be illustrative and not limiting. Variations will occur to those of skill in the art. Those variations are intended to be included in the invention, which is limited only by the spirit and scope of the appended claims.

We claim:

1. A regulator circuit, comprising:
   a bias line to couple to an output of a differential amplifier and to an input of a voltage controlled oscillator;
   a resistor circuit with a negative temperature coefficient, coupled between the bias line and a first voltage source to regulate a bias voltage on the bias line; and
   a bias circuit coupled between the bias line and a second voltage source, wherein the bias circuit includes a tail current bias transistor, the bias circuit to control the current of the differential amplifier.

2. The circuit of claim 1, further comprising a diode coupled between the resistor circuit and the bias line.

3. The circuit of claim 1, wherein the second voltage source is a signal ground.

4. The circuit of claim 1, wherein the resistor circuit includes a first resistor connected to the first voltage source and coupled to the bias line.

5. The circuit of claim 1, wherein the resistor circuit includes:
   first and second switches coupled to the first voltage source;
   a first resistor coupled between the bias line and the first switch;
   a second resistor coupled between the bias line and the second switch;
   programmable logic coupled to the first and second switches to control the first and second switches.

6. The circuit of claim 5, wherein the programmable logic is to select one of the first and second resistors by activating one of the first and second switches and deactivating the other of the first and second switches.

7. The circuit of claim 6, wherein the first and second switches include transistors.

8. A regulator system, comprising:
   a voltage controlled oscillator;
   a clock circuit coupled to the voltage controlled oscillator;
   a charge pump circuit coupled to the clock circuit;
   a voltage divider circuit coupled to the charge pump circuit;
   a differential amplifier coupled to the voltage divider circuit;
   a regulator circuit coupled between the differential amplifier and the voltage controlled oscillator, the regulator circuit including:
   a bias line to couple to an output of a differential amplifier and to an input of a voltage controlled oscillator;
   a resistor circuit with a negative temperature coefficient, coupled between the bias line and a first voltage source to regulate a bias voltage on the bias line; and
   a bias circuit coupled between the bias line and a second voltage source wherein the bias circuit includes a tail current bias transistor, the bias circuit to control the current of the differential amplifier.

9. The system of claim 8, further comprising a diode coupled between the resistor circuit and the bias line.

10. The system of claim 8, wherein the second voltage source is a signal ground.

11. The system of claim 8, wherein the resistor circuit includes a first resistor connected to the first voltage source and coupled to the bias line.

12. The system of claim 8, wherein the resistor circuit includes:
    first and second switches coupled to the first voltage source;
    a first resistor coupled between the bias line and the first switch;
    a second resistor coupled between the bias line and the second switch;
    programmable logic coupled to the first and second switches to control the first and second switches.

13. The system of claim 12, wherein the programmable logic is to select one of the first and second resistors by activating one of the first and second switches and deactivating the other of the first and second switches.

14. The system of claim 12, wherein the first and second switches include transistors.

15. A method, comprising:
    detecting a predetermined portion of an output from a charge pump circuit;
    detecting with a differential amplifier a difference between the predetermined portion and a reference voltage;
    driving an input of a voltage controlled oscillator with an output of the differential amplifier to control a frequency of a clock to drive the charge pump circuit;
    regulating an output voltage of the differential amplifier with a temperature compensated regulator circuit to control the frequency, wherein the temperature compensated regulator circuit includes a tail current bias transistor, the temperature compensated regulator circuit to control the current of the differential amplifier.

16. The method of claim 15, wherein regulating includes:
    biasing the output voltage with a resistor circuit having a negative temperature coefficient.

17. The method of claim 15, wherein regulating includes:
    selecting at least one of the plurality of resistors having a negative temperature coefficient;
    coupling the at least one resistor between a voltage source and the output of the differential amplifier to bias the output voltage.

18. The method of claim 17, wherein said selecting includes selecting with programmable logic.

* * * * *